(12) United States Patent
Uchil et al.

(10) Patent No.: US 7,409,710 B1
(45) Date of Patent: Aug. 5, 2008

(54) METHOD AND SYSTEM FOR DYNAMICALLY GENERATING A WEB-BASED USER INTERFACE

(75) Inventors: Mrudul P. Uchil, San Jose, CA (US); Xuerbin Lue, San Jose, CA (US); Qingwen Cheng, Fremont, CA (US); Bina Keshava, Union City, CA (US); Ping Luo, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 843 days.

(21) Appl. No.: 10/685,989

(22) Filed: Oct. 14, 2003

(51) Int. Cl.
*H04L 9/32* (2006.01)

(52) U.S. Cl. .............................. 726/19; 726/5; 713/155; 713/170; 713/183; 715/745

(58) Field of Classification Search .................. 713/155, 713/170, 182, 183; 726/5, 19; 715/742, 715/745, 760, 780
See application file for complete search history.

(56) References Cited

U.S. PATENT DOCUMENTS

| | | | |
|---|---|---|---|
| 5,875,296 A * | 2/1999 | Shi et al. ........................ | 726/5 |
| 6,918,041 B1 * | 7/2005 | Chen ............................ | 726/14 |
| 7,243,138 B1 * | 7/2007 | Majkut et al. ................ | 709/219 |
| 2002/0159601 A1 * | 10/2002 | Bushmitch et al. ........... | 380/277 |
| 2004/0243832 A1 * | 12/2004 | Wilf et al. .................... | 713/200 |
| 2006/0185021 A1 * | 8/2006 | Dujari et al. .................. | 726/27 |

* cited by examiner

*Primary Examiner*—Matthew Smithers
*Assistant Examiner*—Paul Callahan
(74) *Attorney, Agent, or Firm*—Osha Liang LLP (57) ABSTRACT

A method and system for dynamically generating web based user interfaces. In one embodiment, a method is disclosed for displaying a user interface over a network to a user. The method begins by reading an HTTP request for authentication from a browser associated with the user. The HTTP request comprises credential information associated with the user. Based on the credential information, a first plug-in module from a plurality of plug-in modules is invoked to authenticate the user. Also, each of the plurality of plug-in modules provide similar authentication services. An authentication user interface is dynamically generated based on the HTTP request and configuration properties that are defined by the first plug-in module.

23 Claims, 7 Drawing Sheets

THIS SERVER USES LDAP AUTHENTICATION

USER NAME: [_____________] — 410

PASSWORD: [_____________] — 420

[ LOGIN ] — 430

METHOD AND SYSTEM FOR DYNAMICALLY GENERATING A WEB-BASED USER INTERFACE

BACKGROUND OF THE INVENTION

1. Field of the Invention

Embodiments of the present invention relate to the field of network communications. More particularly, embodiments of the present invention relate generally to the generation and display of web based user interfaces.

2. Related Art

User interfaces provide a means to a user for visually interacting with a server provider that supplies services or content over a communication network. The user can select or activate various options and navigate through the site by interacting with the user interface through the mouse, keyboard, or through other means.

In conventional systems, the service provider typically generates a static user interface that is sent to all users accessing the service provider for content or services. Within this environment, the software code that implements and generates the user interface may become too rigid and unchangeable. This is especially true as the user interface becomes more complex through evolution by providing additional service and content features.

One problem with the development of static user interfaces is the inability to easily implement evolutionary changes within the user interface. Any change, visual or otherwise, to the user interface, whether it involves the addition of new features, modifications to old features, or corrections to old features, would necessarily include rewriting the software code that implements the user interface that is used to interact with the server provider. Bringing the rewritten code to operation can be quite difficult and time consuming as the entire software code that implements the user interface must be rechecked and compiled to ensure its viability.

Another problem with a static user interface is the inability to introduce customization of the user interface. Again, any customization of the user interface would require the changing and rewriting of the software code that implements the user interface. As such, any customization would again be difficult. Customization may include personalizing the user interface to the user, or personalizing the user interface to reflect the various selectable and heterogeneous sources that may provide the same service through the service provider As a result, application developers for service providers would find it difficult to make changes to user interfaces that accommodate for new features, modifications to old features, or corrections to old features since the conventional technology required a complete change of the code implementing the service. Moreover, customization of the user interface to personalize the user interface to the user and extend the functionality of the service is difficult for many of the same reasons.

This inability to easily add new features to existing code to accommodate the evolutionary change of the user interface makes it difficult for the service provider to exist within a heterogeneous environment where selection between multiple sources that provide a similar service is possible. As a result, this leads to a stagnation of service provider, forcing users to interact with outdated user interfaces.

SUMMARY OF THE INVENTION

Accordingly, various embodiments of the present invention disclose a method and system for dynamically generating web based user interfaces. Dynamic generation of possible through the implementation of a pluggable architecture that comprises a plurality of plug-in modules providing a plurality of similar and different web services. The pluggable architecture allows for the introduction of extensions to the current architecture. In that way, new features, modifications to features, and customizations can be easily added to the architecture through new plug-ins.

In one embodiment, a method is disclosed for dynamically generating web based user interfaces. The method discloses the display of an authentication user interface (UI) over a network to a user. The present embodiment begins by reading a hypertext transfer protocol (HTTP) request for authentication from a browser associated with the user. The user is attempting to authenticate itself to a server that has the capability of supporting various third party authentication mechanisms. The server has access to a plurality of plug-in modules that provide the various third party authentication mechanisms.

The HTTP request comprises credential information associated with the user. Within a particular environment, the credential information identifies the user according to predetermined parameters. For example, within a business environment, the credential information comprises role, organization, service, user, and direct plug-in module information. The user information identifies the user, such as, name and password. The organization information identifies from which business organization the user is associated with. The role information indicates provides a job description of the user within the organization. The service information identifies the web service for which the user is ultimately requesting (e.g., banking service). The direct plug-in module indicates which plug-in to invoke when the user is requesting authentication services.

Based on the various credential information, a first plug-in module is invoked from a plurality of plug-in modules. In the present embodiment, the first plug-in module is used for authenticating the user. Also, each of the plurality of plug-in modules provide similar authentication services, and can be used to authenticate a user to the server. Selection of the proper plug-in module is dependent on one or more items of credential information, as provided by the user. For example, a particular organization as identified by the user as credential information may use a particular authentication service that is associated with a specific plug-in module. In addition, a default authentication service that is associated with a specific default plug-in module can also be invoked when insufficient credential information is provided.

An authentication user interface is dynamically generated based on the HTTP request and configuration properties that are defined by the first plug-in module. The authentication user interface is dynamically generated by selecting a web page template from which the authentication user interface is based upon. The web page template is selected from a plurality of web page templates, each of which is associated with a category of service, or other identifying category.

In the present embodiment, the HTTP request identifies the category of service that is requested, and is used to determine the selection of the web page template from the plurality of web page templates. As such, the web page template provides a general layout of the resulting authentication user interface.

In addition, in the present embodiment, the first plug-in module provides configuration properties that are used to further define the authentication user interface. For example, the configuration properties may define the number of passwords needed to authenticate the user for the authentication service associated with the first plug-in module. Also, the configuration properties provides for information that is implemented with the authentication user interface. This information is implemented using precompiled tag library components.

The plurality of templates and the configuration properties allow for the customization of web based authentication user interface. For example, the customization can be tailored to include the trademark signature of an organization, instead of a generic representation of an authentication user interface. Other customization include modifications to existing features as presented within the plurality of plug-in modules. Still other customization includes correction of existing features as presented within the plurality of plug-in modules.

In another embodiment, a system for dynamically generating a web based user interface is disclosed. The system comprises a web based user interface module for receiving HTTP requests over the network and dynamically generating an authentication user interface based on the HTTP request and configuration properties of a selected plug-in module. The system also comprises a plurality of plug-in modules coupled to the web based user interface module. Each of the plurality of plug-in modules provide web services. For example, within an authenticating environment, each of the plurality of plug-in modules can provide authentication services from various third party providers. Also, the system comprises a model module coupled to the web based user interface module and to the plurality of plug-in modules. The model module selects a plug-in module from the plurality of plug-in modules based on the HTTP request. In addition, the model module provides an interface between the web based user interface module and said plurality of plug-in modules.

DETAILED DESCRIPTION OF THE INVENTION

Reference will now be made in detail to the preferred embodiments of the present invention, a method and system of dynamically generating a web based user interface, examples of which are illustrated in the accompanying drawings.

Embodiments of the present invention can be implemented on software running on a computer system. The computer system can be an embedded system, a personal computer, notebook computer, server computer, mainframe, networked computer, handheld computer, personal digital assistant, workstation, and the like. This software program is operable for supporting the transfer of information within a network of trusted partner sites using artifacts. In one embodiment, the computer system includes a processor coupled to a bus and memory storage coupled to the bus. The memory storage can be volatile or non-volatile and can include removable storage media. The computer can also include a display, provision for data input and output, etc.

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving," "sending," "generating," "reading," "invoking," and "selecting," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Accordingly, various embodiments of the present invention disclose a method and system for dynamically generating a web based user interface (UI). Dynamic generation of web based user interfaces is possible through the implementation of a pluggable architecture that comprises a plurality of plug-in modules providing a plurality of similar and different web services. The pluggable architecture allows for the introduction of extensions to the current architecture. In that way, new features, modifications to features, and customizations can be easily added to the architecture through new plug-ins.

Figure 1:
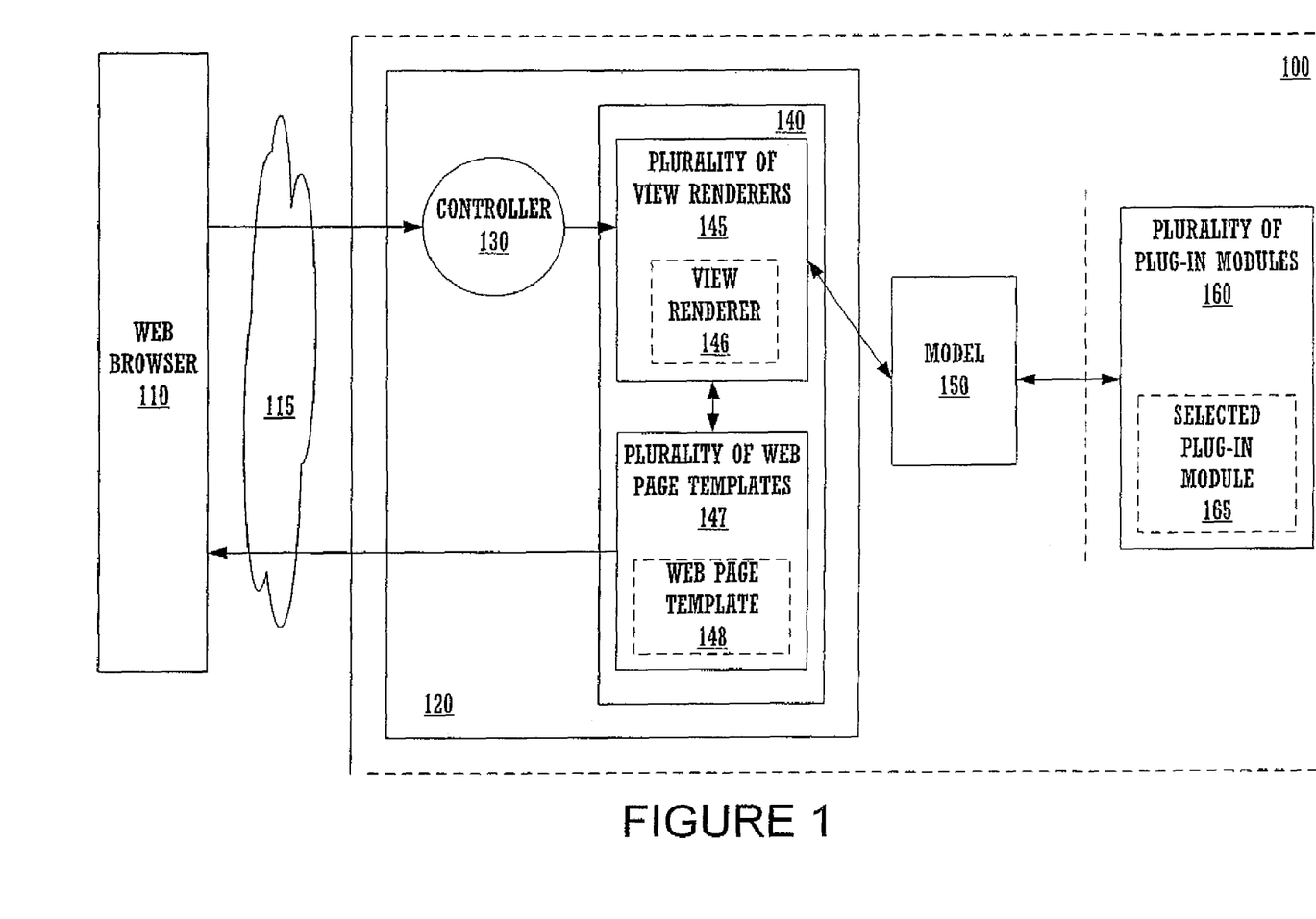
FIG. 1 is a block diagram of a communication network including a service provider that supports the dynamic generation of web based user interfaces in response to a request for access, in accordance with one embodiment of the present invention.

Referring now to FIG. 1, a block diagram of a system 100 is shown that is capable of supporting the dynamic generation of web based user interfaces, in accordance with one embodiment of the present invention. The system 100, as shown, is coupled to a web browser 110 through a network 115. The network 115 can be any network, such as, a local area network, a wide area network, or a network supporting the Internet. A user (now shown) is associated with the web browser, and communicates with the system 100 for access to content and/or services. Communication from the user is generally in the form of hypertext transfer protocol (HTTP). In response, the system 100 dynamically generates a web based user interface to facilitate the communication between the user and the system 100 for user access to the content and/or services.

The system 100 is based on a Model-View-Controller design model (MVC) of an application, such as, an authentication service application, in one embodiment of the present invention. The system 100 comprises a UI generator 120, a model 150 and a plurality of plug-in modules 160. As configured, the system 100 enables the independence of each of the components of the system 100 from the external representation of the generated user interface. As a result, the separation of code from the generated user interface enables easy and flexible modification and customization of the user interface through the implementation of additional plug-in modules.

As shown in FIG. 1, the UI generator 120 comprises a controller 130 and a viewing module 140 that are communicatively coupled together. The controller 130 and the viewing module 140 represent the dynamic generation of the user interface of the application. The UI generator is conceptually split into input and output components. The controller 130 comprises the input component that interfaces with the web browser 110 and supplies information to the viewing module 140. For example, the information could be personal information unique to the user associated with the web browser 110. The controller 130 also invokes the appropriate view renderer, a selected view renderer 146, in the plurality of view renderers 145, as determined by the HTTP request 112 from the web browser 110.

The viewing module 140 comprises the application logic to implement the service application, such as, the authentication service application. The viewing module 140 is the output component which displays the content information and/or the dynamically generated web based user interface. More specifically, each of the plurality of view renderers 145 comprise the application logic for a plurality of corresponding service applications. In general, each of the plurality of view renderers 145 provides for the computational analysis and data manipulation of the application in order to dynamically generate a web based user interface. As an example, one of the plurality of view renderers 145 comprises the application logic for an authentication service application.

The model 150 is communicatively coupled to the viewing module 140. The model 150 provides for database access. In addition, the model 150 interfaces with the plurality of plug-in modules 160. As such, the model 150 provides the logic for selecting the proper plug-in module to process the HTTP 112 request from the web browser 110. For example, the model 150 selects the selected plug-in module 165 in order to process the HTTP 112 request.

The plurality of plug-in modules 160 comprises one or more services supported by one or more service applications available to the user associated with the web browser 110. For example, the plurality of plug-in modules 160 may provide authentication services. In that case, each of the plurality of plug-in modules 160 would provide similar authentication services in order to authenticate the user associated with the web browser 110 further access to the system 100. Each of the plurality of plug-in modules 160 provide configuration properties for outlining the requirements of the particular application associated with the plug-in module. For example, one authentication service application may require two passwords, whereas, another authentication service application may require three passwords.

The configuration properties allow for the customization of web based authentication user interface. For example, the customization can be tailored to include the trademark signature of an organization, instead of a generic representation of an authentication user interface. Other customization include modifications to existing features as presented within the plurality of plug-in modules. Still other customization includes correction of existing features as presented within the plurality of plug-in modules.

Selection of one of the plurality of plug-in modules 160 to provide the authentication services is dependent on credential information, as provided by the user. Credential information includes, for example, to which organization is the user associated with, since different organizations may use different authentication services.

As a result, the selected view renderer 146 captures state changes as determined by the model 150 and the selected plug-in module 165. The selected view renderer 146 then is capable of invoking the proper web page template in the plurality of web page templates 147. The web page template provides the basic layout of the resulting user interface. For example, the selected view renderer 146 selects the selected web page template 148 in response to the HTTP request 112. The web page templates allows developers and page designers to pull data from Java objects from predetermined and predesigned customized tag library components to display different elements in the resulting user interface.

The resulting web based user interface is dynamically generated by the selected view renderer 146 by incorporating the tag library components as determined by the configuration properties as provided by the selected plug-in module 165 with the selected page template 148.

In one embodiment, the system 100 substantially complies with the Java™ 2 Enterprise Edition (J2EE) standard, or its derivatives. In addition, in another embodiment, the system 100 complies with the J2EE Assisted Takeoff (JATO) standard, or its derivatives. More particularly, the plurality of page templates 147 comply with the Java Server Pages (JSP) technology included within J2EE. The JATO, J2EE platform and their framework layers, including JSPs and Java servlet application protocol interfaces (APIs), provide for a portable and standards-based foundation for building Web applications, and is applicable for dynamically generating web based user interfaces.

As a result, the J2EE and the JATO standards define a common framework for building web applications in an interoperable manner across different vendor platforms. Thus, the framework associated with the system 100 can be accessed by any interface or plug-in that is based on the J2EE and JATO technology. For example, various third party vendors may supply an authentication application to be used within the system 100 for authenticating users.

Moreover, within the JATO and the J2EE framework, the JSP web page templates and the configuration properties as defined by the plurality of plug-in modules 160 provide a means to modify, correct, or extend the features as established within an application. Rather than effectively changing the entire code that is associated with a web-based application, as in the prior art, the present embodiment is able to focus on making modifications, corrections, or extensions to features of an application through the addition of one or more plug-in modules, or the development of new JSP web page templates.

In one case, the JSP templates and configuration properties can be modified to reflect an organization's branding or to add organization specific functionality. In this way, the user interfaces can be customized to reflect those particular organizations.

For example, one case includes three different organizations having access to the system 100. Each of the three organizations utilize an authentication procedure to access the system 100. For purposes of customizing the user interface, one organization can implement a customized set of web page templates that help generate a customized user interface to be presented to a user when the user is authenticating to the system 100. Additionally, any organization that does not have its own customized set of web page templates can use a default set of web page templates for generating user interfaces.

Figure 2:
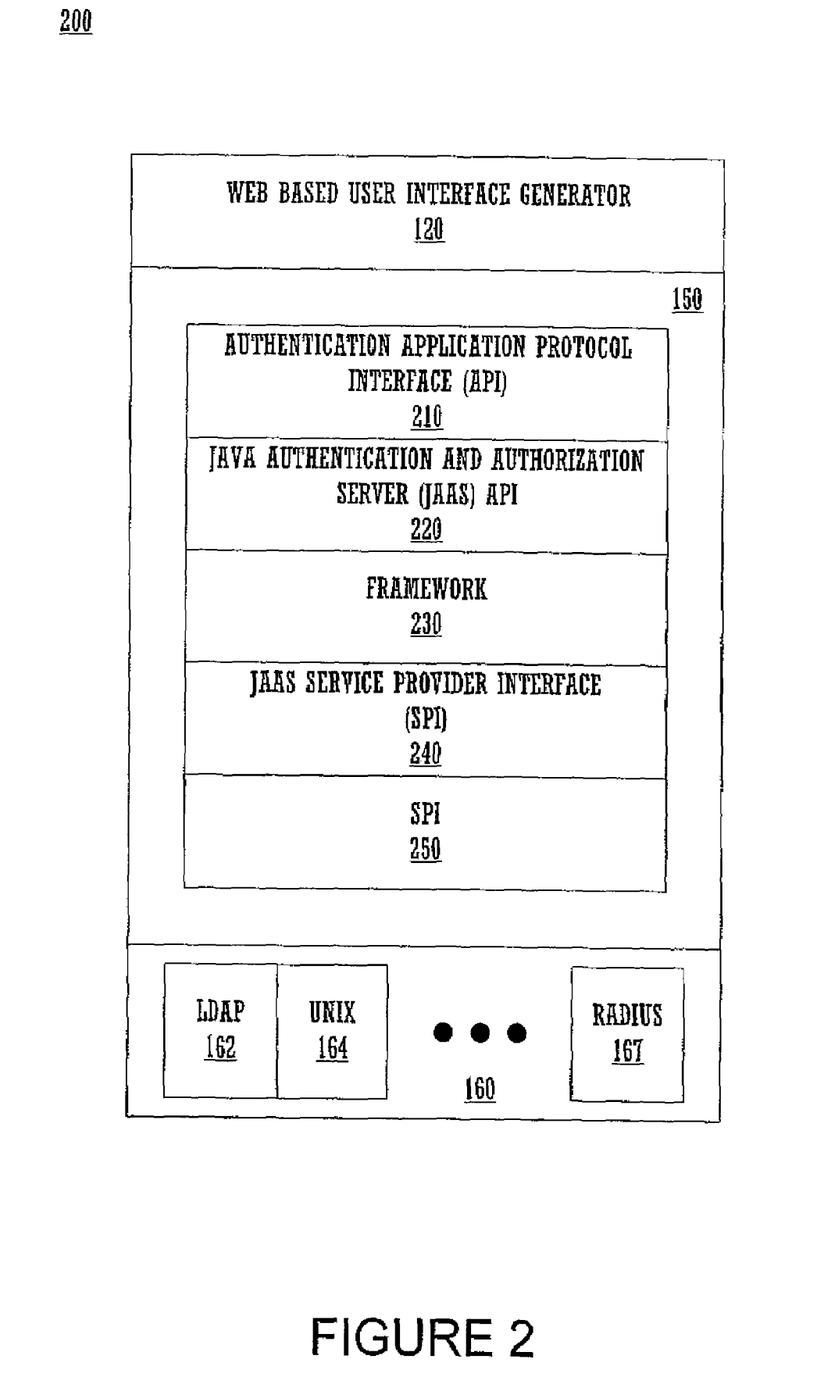
FIG. 2 is a block diagram of an authentication component of a service provider that supports the dynamic generation of web based user interfaces in response to a request for access, in accordance with one embodiment of the present invention.

FIG. 2 is a block diagram of an authentication architecture 200 from which an authentication application is used to identify and authenticate a user, in accordance with one embodiment of the present invention. The authentication architecture 200 is used to provide secure access to web-based, and non web-based, applications and the data contained therein.

The authentication architecture 200 is implemented within the system 100 of FIG. 1, in one embodiment. As such, the authentication architecture 200 comprises the web based UI generator 120, the model 150 and the plurality of plug-in modules 160 of FIG. 1. The web based UI generator 120 has been previously discussed in full in relation to FIG. 1.

The model 150 provides the logic for interfacing between the web based UI generator 120 and the plurality of plug-in modules 160. The module 150 comprises an authentication API 210, a Java Authentication and Authorization Server (JAAS) API 220, a Framework 230, a JAAS Service Provider Interface (SPI), and an SPI 250.

In addition, the authentication API 210 provides the logic within the model 150 for selecting the proper plug-in module in the plurality of plug-in modules 160. The authentication API 210 is communicatively coupled to the web based UI generator 120. Moreover, the authentication API 210 provides for the interface between the web based UI generator 120 and the model 150 to allow for communication.

The JAAS API 220 is communicatively coupled to the authentication API 210. As such, the authentication API writes to the JAAS API 220. The JAAS standard provides a standard programming interface for authenticating uses and for assigning privileges once a user has been authenticated. In addition, the JAAS API 220 is configured to operate within the pluggable and stackable architecture 200 that supports various authentication third party services to provide varying security requirements. This is because, depending on the security parameters of a particular authentication third party service, different kinds of proof may be required for authentication.

The authentication architecture 200 enables applications at the authentication API layer 210 to remain independent from the underlying authentication third party services associated with the plurality of plug-in modules 160. Hence, new authentication third party services that become available, or updates, modifications, or corrections to current services can be implemented through additional plug-in modules. As a benefit, existing authentication APIs 210 need not be modified or recompiled to accommodate the new features, modifications, updates, or corrections.

The framework 230 is communicatively coupled to the JAAS API 220, and provides for a translation interface between the SPI applications (e.g., 240 and 250) and the API applications (e.g., 210 and 220) of the model 150. In addition, the framework 230 provides a means for access to various databases, including configuration and information databases for each of the plurality of plug-in modules 160.

The JAAS SPI 240 is communicatively coupled to the framework 230. The JAAS SPI 240 provides the interface for the JAAS API to communicate with the third party vendors associated with the plurality of plug-in modules 160. Communication is through the SPI layer 250, as the authentication architecture 200 may provide for other services separate from authentication. As such, the SPI layer 250 provides an interface for the JAAS SPI layer 240 to communicate with plurality of plug-in modules 160. Thus, the authentication mechanism specific modules in the plurality of plug-in modules 160 at the back end of the authentication architecture 200 write directly to the SPI 250 independently of the authentication API 210.

The plurality of plug-in modules 160 provide a means for third party vendors to provide authentication services within the authentication architecture 200. As such, the plurality of plug-in modules 160 provides a means for incorporating additional features, customization, updates, or corrections into the authentication services and the resulting user interface provided through the authentication API 210.

In one embodiment, the plurality of plug-in modules 160 support various third party vendors that supply authentication services. For example, a list of proprietary authentication services comprising the plurality of plug-in modules 160 include, but is not limited to the following: anonymous, certificate, Lightweight Directory Access protocol (LDAP), membership, NT, RADIUS, Safeword, Unix, Kerberos, etc.

The anonymous plug-in module allows a user to log-in to a system (e.g., system 100) without specifying a user name and/or password. Additionally, an anonymous user can be created. In general, anonymous connections for communication are generally limited in access to content and services in the system.

The certificate plug-in module allows a user to log-in through a personal digital certificate (PDC) that could optionally use the Online Certificate Status Protocol (OCSP) to determine the status of a certificate.

The LDAP plug-in module provides a set of protocol for accessing information directories. LDAP supports the transmission control protocol/Internet protocol (TCP/IP) which is necessary for Internet access. The LDAP protocol makes it possible for any application running on any computer platform to obtain directory information, such as, e-mail addresses, authentication information, public keys, etc.

Also, the NT plug-in module allows for authentication using a Windows™ NT server. The RADIUS plug-in module allows for authentication using an external Remote Authentication Dial-In User Service (hence the acronym, "RADIUS") server. The Safeword plug-in module allows for authentication using servers and tokens associated with Secure Computing. The UNIX plug-in module allows for authentication using a user's UNIX identification and password.

Figure 3:
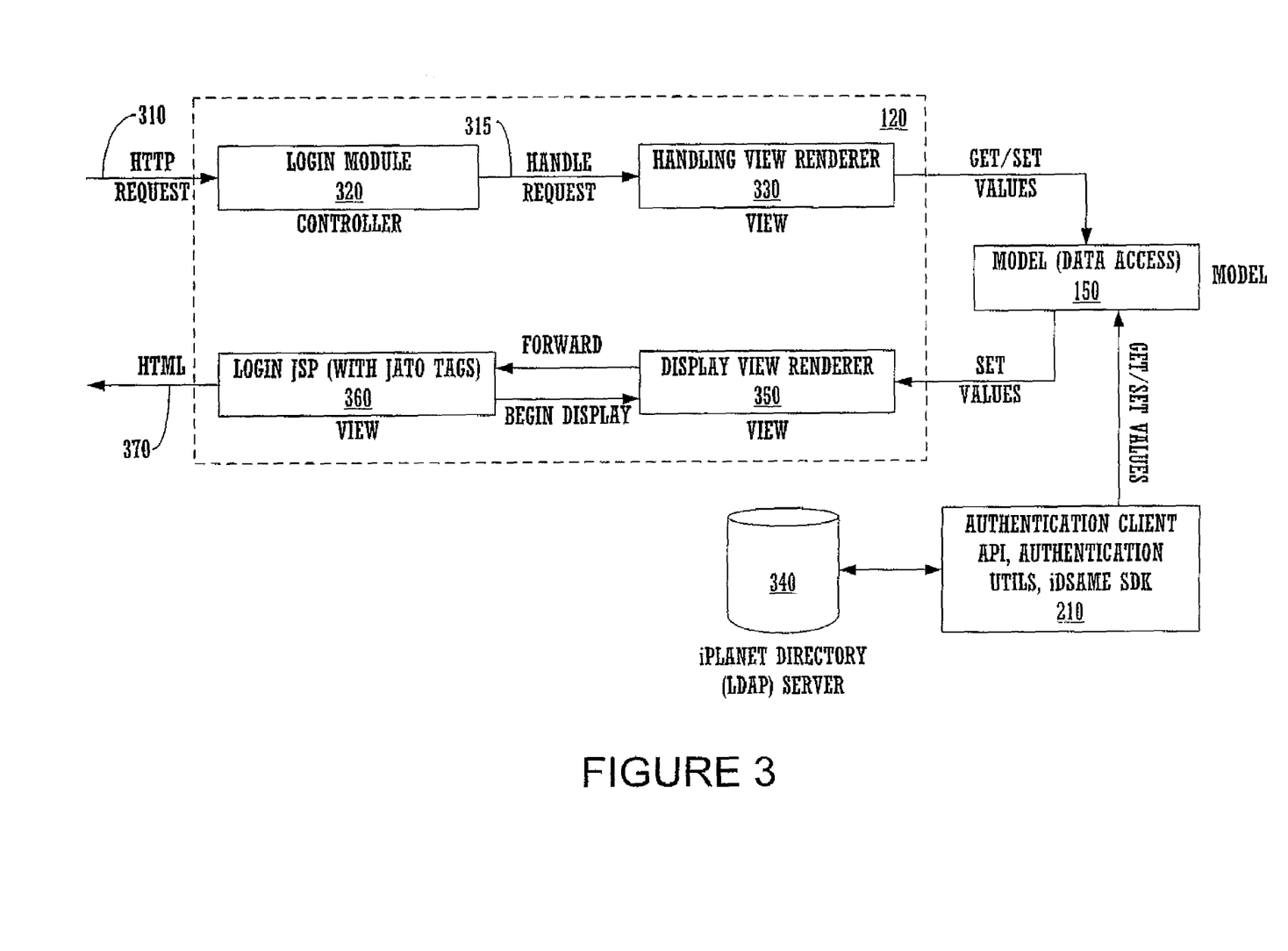
FIG. 3 is a data flow diagram illustrating the flow of information through the authentication component of the service provider of FIG. 2 when dynamically generating the web based user interface in response to a request for access, in accordance with one embodiment of the present invention.

Now referring to FIG. 3, a data flow diagram 300 illustrates the flow of information when dynamically generating a web based authentication user interface, in accordance with one embodiment of the present invention. The data flow diagram is implemented within the system 100 of FIG. 1 in one embodiment, and similarly numbered components as shown in FIG. 2 corresponds to similarly number components of FIG. 1.

The authentication process begins with an HTTP request 310 from a web browser associated with a user. The HTTP request 310 is sent to the UI generator 120, or more specifically, the login module servlet 320. The login module servlet 320 performs similar functions as the controller 130 of FIG. 1. The login module servlet 320 receives the HTTP request 310, and performs the credential gathering. The HTTP request 310 contains credential information that is associated with the user. Credential information has been previously described, and identifies the user.

Within the flow diagram 300, when authenticating the user, the client type of the web browser making the HTTP request is identified. The login module 320 uses URL information to retrieve characteristics of the web browser that generated the HTTP request 310. Based on these characteristics, the proper authentication user interface is sent back to the client browser. For example, a personal computer is configured to handle hypertext markup language (HTML) web pages, whereas, a mobile phone is configured to handle wireless markup language (WML) web pages.

The login module 320 or controller determines the proper handling view renderer 330 to handle the HTTP request 310. As such, the login module 320 generates a handle request to the proper handling view renderer 330. The handling view renderer 330 and the display view renderer 350 retrieves and sets data from and to the model 150. More particularly, the handling view renderer 330 and the display view renderer 350 interact with the model 150 to retrieve required data from a data source (not shown), and to set user entered data into the data source. In one embodiment, the handling view renderer 330 is independent from the display view renderer 350. In another embodiment, the handling view renderer 330 and the display view renderer 350 is contained within the same unit and performs both the handle and the display functions in two different modes.

The model 150, through the authentication client API 210 of FIG. 2 determines and interacts with the particular plug-in module 340 that houses the particular third party authentication mechanism, such as, the LDAP authentication mechanism shown in FIG. 3. In addition, the model 150 retrieves the configuration properties as defined by the plug-in module 340 for incorporation within the resulting user interface 370 that is outputted by the UI generator 120.

After data is set by the model, the display view renderer 350 selects the selected JSP 360 that is used for generating the resulting user interface 370. The display view renderer 350 controls the information displayed in the selected JSP 360. The selected JSP 310 defines the look and feel of the resulting user interface 370 by using precompiled JATO tags or tags from a common tag library. The display elements, or tags, are associated with required callbacks from the authentication API 210 in the model 150.

As shown in FIG. 3, the selected JSP is the login JSP 360 that forms the basic layout of the resulting user interface 370 outputted by the UI generator 120. It is important to note that the display renderer 350 is capable of changing the selected JSP depending on the configuration properties and HTTP request 310 received by the UI generator 120.

The resulting user interface 370 is dynamically generated by the UI generator 120. The resulting user interface 370 is customizable to the selected plug-in module that is providing the authentication services, in one embodiment. In another embodiment, the resulting user interface 370 is configured with the proper formatting that is supported by the web browser submitting the initial HTTP request 310. As shown in FIG. 3, the user interface is configured in the HTML format, however, the user interface 370 could be in any format that is supported by the web browser, such as, WML, etc.

Figure 4:
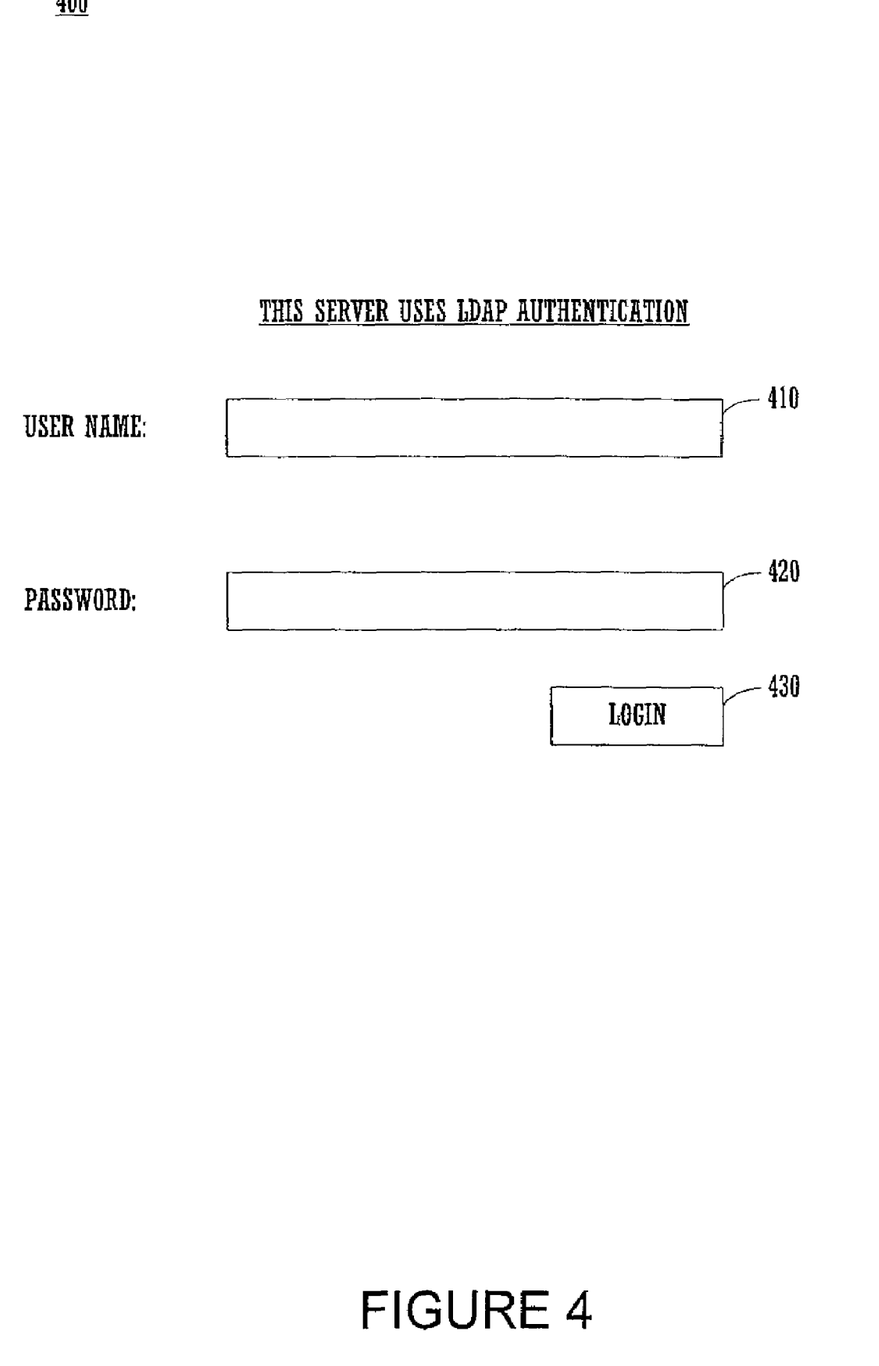
FIG. 4 is a diagram of an exemplary user interface that is dynamically generated, in accordance with one embodiment of the present invention.

FIG. 4 illustrates a screen shot of a user interface 400 for the LDAP authentication. The user interface 400 is used for gathering further user credential for authentication and is presented to the web browser associated with the user requested access. As shown in FIG. 4, the user is presented with blocks 410 and 420 for requesting the user name and password. A login block 430 is presented for means of submitting the additional user credentials.

Figure 5:
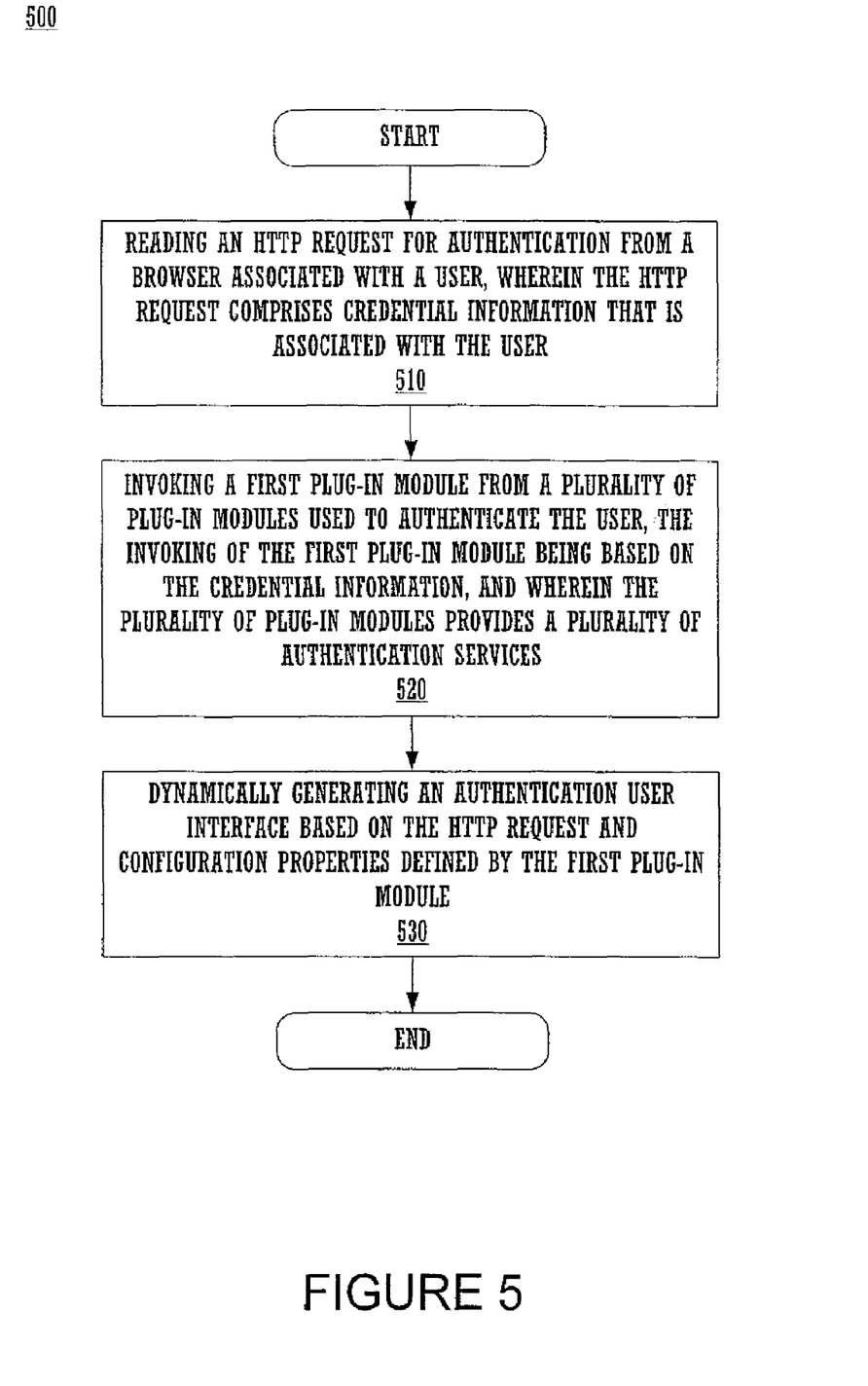
FIG. 5 is flow chart illustrating steps in a computer implemented method for dynamically generating a web based authentication user interface, in accordance with one embodiment of the present invention.

FIG. 5 is a flow chart 500 illustrating steps in a computer implemented method for dynamically generating an authentication user interface, in accordance with one embodiment of the present invention. The method of flow chart 500 is implemented within a pluggable architecture that allows for the customization, modification, addition, and correction of new and current features in the dynamically generated user interfaces as applied through plug-in modules.

The present embodiment begins by reading an HTTP request for authentication from a browser associated with a user, at 510. The HTTP request comprises credential information associated with the user. As described previously, the credential information comprises identifying information that is helpful in determining which authentication service, and its corresponding plug-in module, is selected to provide authentication services through the pluggable architecture to the user. For example, the credential information identifies the organization that the user is associated with. Each organization is associated with a particular authentication service that authenticates its users, in one embodiment.

In one embodiment, the HTTP request is received over a network from a web browser that is associated with a requesting user. The user is requesting information or services. The HTTP request comprises a login request to authenticate said user.

The login request comprises uniform resource locator (URL) information and additional query information. The URL information provides a means for reaching the server having access to the content or services requested by the user. The query information is attached information that is particular to the user. In one embodiment, the query information comprises the credential information that is used for determining the required authentication services used in a selected plug-in module to authenticate the user.

The query information comprises at least one URL parameter attached to the HTTP login request. A URL parameter is a name/value pair appended to the end of the URL. The parameter starts with a question mark (?) and takes a "name=value" form. More than one URL parameter can be attached to the URL. More specifically, the URL parameters pass on information to the server. Table 1 lists a partial list of URL parameters that when appended to an HTTP request as an authentication URL redirects the user to the appropriate resource after authentication.

Partial List of URL Parameters

TABLE 1

| | |
|---|---|
| goto | Sends a user to the noted URL after successful authentication |
| gotoOnFail | Sends a user to the noted URL after unsuccessful authentication |
| org | Provides the requesting user's organization |
| user | Provides the user name when the authenticating service is defined at the user level |
| role | Defines the role of the user when the authenticating service is configured on a per-role basis |

TABLE 1-continued

| | |
|---|---|
| module | Directs the user immediately to a specific authentication plug-in module |
| service | Defines the service requested by the user |
| authlevel | Defines the minimum configured authentication level to be used when authenticating the user, wherein the authentication levels are defined by a fixed integer authentication level |
| domain | Directs the user to login into a specific domain |
| iPSPCookie | Allows a user to login with a persistent cookie, so that the user can login with a new browser session without having to reauthenticate. |
| Login.Token1 | Allows a user to login without authenticating |
| Login.Token0 | Allows a user to login anonymously |

In one embodiment, the URL parameter indicates a persistent cookie support. This parameter allows a user to login using a persistent cookie. A persistent cookie is one that continues to exist after the browser window is closed. In other words, the session started initially between a user and a server can be extended using a persistent cookie. As such, once a user has authenticated and closed a browser, the user can login again with a new browser session and will be directed to a URL without having to reauthenticate.

At 520, the present embodiment invokes a first plug-in module from a plurality of plug-in modules. The first plug-in module provides the authentication mechanism used to authenticate the user. The selection of the first plug-in module is based on the credential information. Using the previous example, a user associated with a particular organization is directed to a particular plug-in module that is associated with the third party source that provides authentication services.

It is important to note, in the present embodiment, each of the plurality of plug-in modules provide authentication services for authenticating the user. Proper selection of the proper authentication service for a particular user is important for proper authentication of the user.

At 530, the present embodiment dynamically generates a first user interface based on the HTTP request and the configuration properties that are defined by the first plug-in module. The first user interface is customizable to the credential information provided by the user and to the particular plug-in module that is selected to provide authentication services.

Figure 6:
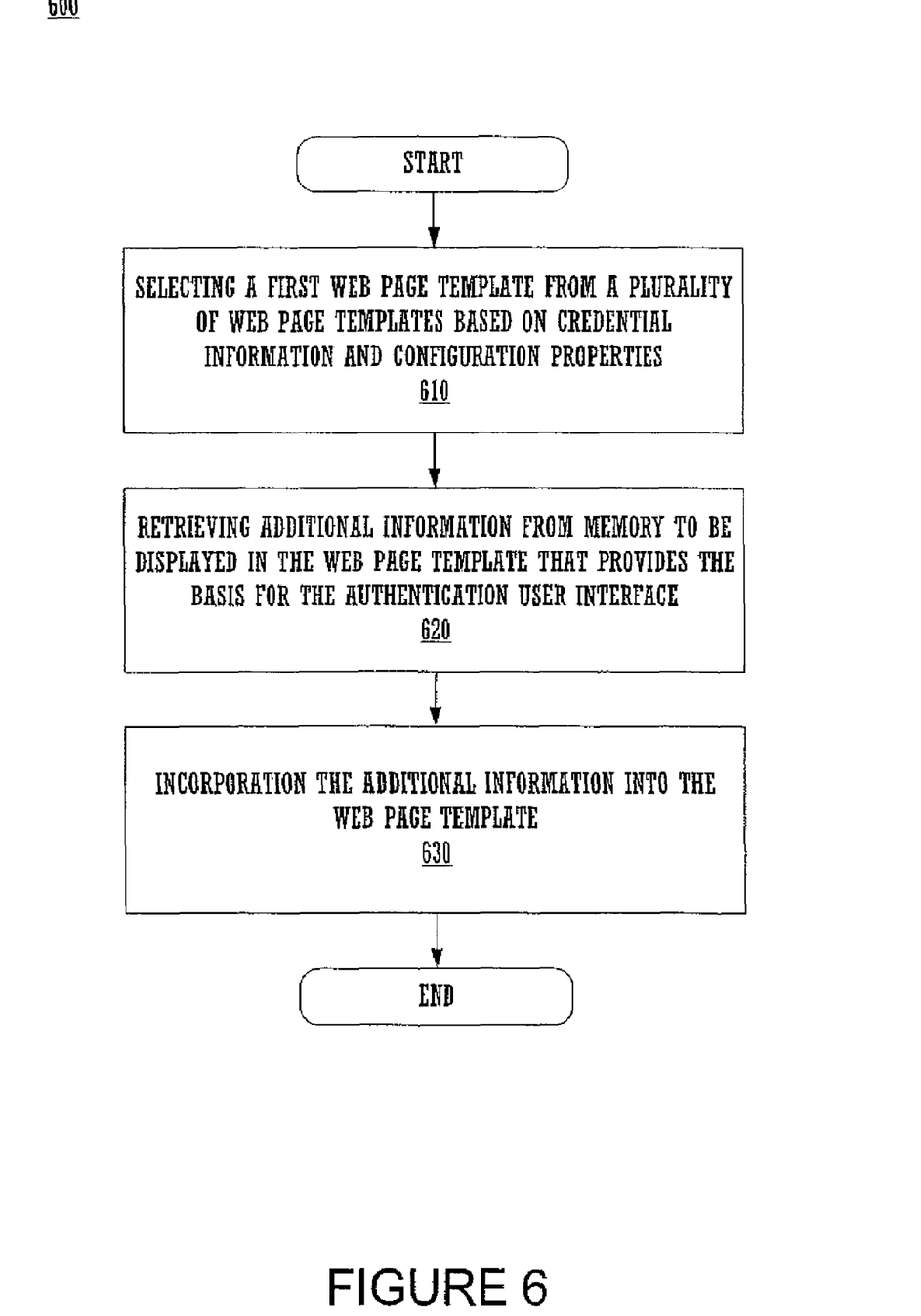
FIG. 6 is a flow chart illustrating steps in a computer implemented method for selecting a web page template used for dynamically generating a web based user interface, in accordance with one embodiment of the present invention.

FIG. 6 is a flow chart 600 illustrating steps in a computer implemented method for creating the resulting authentication user interface, in accordance with one embodiment of the present invention. In one embodiment, the method of flow chart 600 is implemented in conjunction with the method of flow chart 500. As such, the particular plug-in module has been selected. Accordingly, the configuration properties associated with the selected plug-in module are known.

The present embodiment begins by selecting a first web page template from a plurality of web page templates. The plurality of web page templates comprise JSP pages, as previously described in full. The JSP pages are used to provide a basic layout of the resulting user interface. In addition, the JSP templates are customizable. Different user resulting user interfaces are created and customized by generating a different JSP page.

In one embodiment, the first web page template is selected based on credential information provided by the user. In addition, the first web page template is based on the configuration properties defined by the selected plug-in module providing the authentication services.

At 620, the present embodiment continues by retrieving additional information from a memory source. The additional information is required to be displayed in the selected web page template.

At 630, the present embodiment continues by incorporating the additional information into the web page template. In this way, the resulting user interface is dynamically generated.

For example, a JSP page contains two basic types of information, or content: static content and dynamic content. The static content is the standard HTML markup and text that will be rendered to the user without modification. The present embodiment retrieves the static content from a memory resource to build up selected JSP web page to dynamically generate the user interface. For example, referring back to FIG. 4, the label of "user name" associated with block 410 is a static content, and is retrieved to be displayed in the user interface 400 to the user.

On the other hand, dynamic content is typically represented as tags that is processed at the time of request and translated into an HTML or other format. This provides the basis for dynamic generation of a user interface. As described previously, the tags are JATO tags or other third party JSP tags comprising precompiled tag library components that are used with the selected view renderer to create and render content in the resulting user interface.

To complete the process, the dynamically generated resulting user interface is sent to the browser that is associated with the requesting user over a network. Additional information can be passed between the server and browser through requests and responses associated with one or more dynamically generated user interfaces.

While the present embodiment illustrates JSP pages forming the basis of authentication user interfaces, other JSP web pages comprise any number of varying types of user interfaces that provide and are associated with varying types of content and services. Table 2 is a partial list of varying types of JSP pages.

Partial List of Customizable JSP Templates

TABLE 2

| | |
|---|---|
| AauthException.jsp | Informs the user that an error has occurred during authentication |
| Aaccount_expired.jsp | Informs the user that their account has expired |
| Cconfiguration.jsp | Informs the user that there has been a configuration error |
| Eexception.jsp | Informs the user that there has been an error |
| Iinvalid_domain.jsp | Informs the user that there is no such domain |
| IinvalidPCookieUserid.jsp | Informs the user that a persistent cookie user name does not exist in the persistent cookie domain |
| InvalidPassword.jsp | Informs the user that the password entered does not contain enough characters |

In one embodiment, the pluggable architecture used for dynamically generating a user interface is configured to display varying types of errors. Depending on the type of error produced, a plug-in module and/or JSP page is selected to dynamically generate a customizable user interface that informs the user of the specific type of error that occurred. Additional action may be requested from the user in the user interface, in one embodiment.

In another embodiment, a session token is generated upon successful authentication of the user. The session token authorizes access to services and content provided by the server. In addition, the session token also comprises credential information as provided by the user. Also, any additional credential information discovered during the authentication process that is associated with the user is provided with the token. For example, the persistent cookie support is provided within the session token, in one embodiment.

Figure 7:
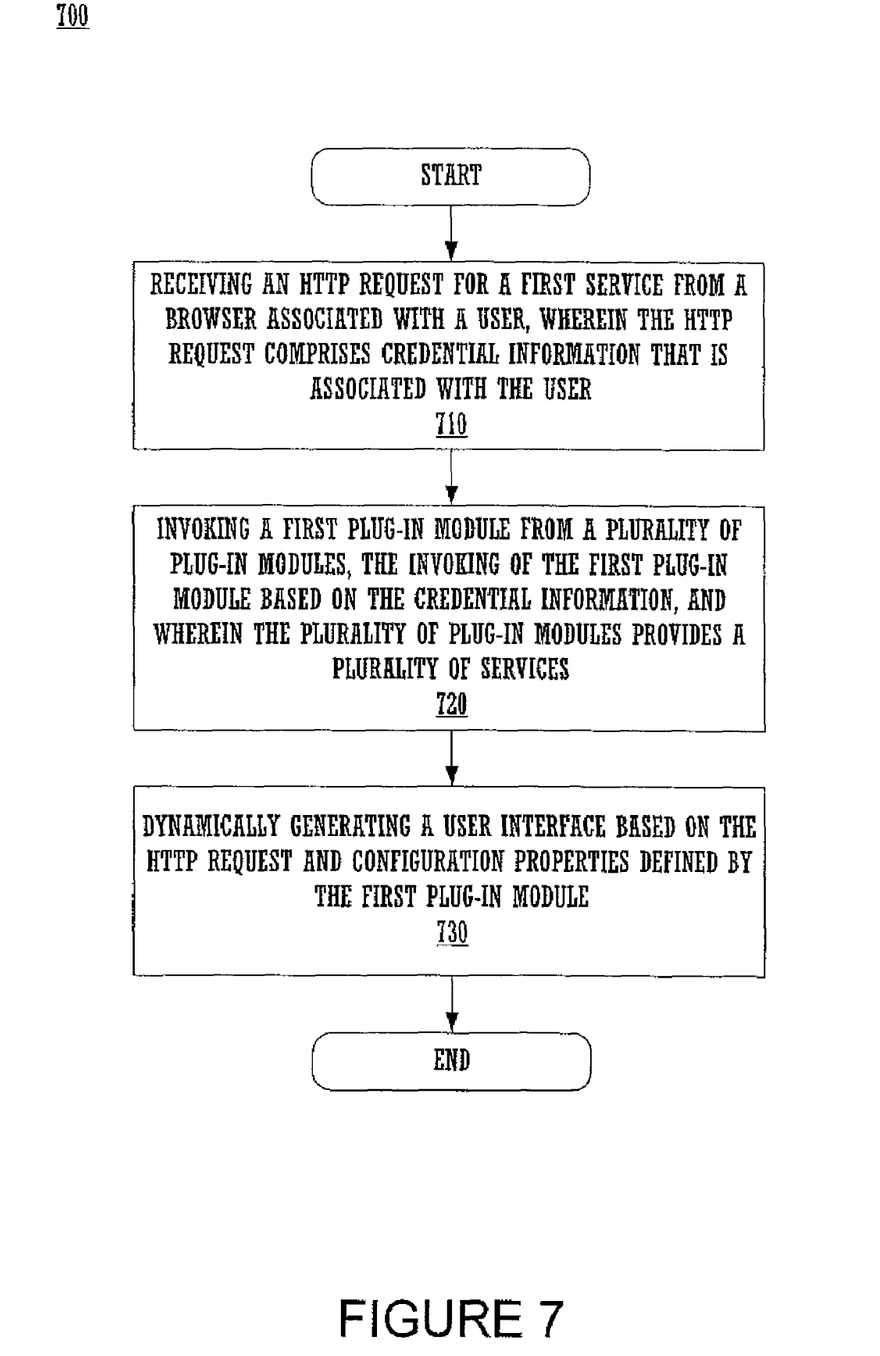
FIG. 7 is a flow chart illustrating steps in a computer implemented method for dynamically generating a web based user interface for services in general, in accordance with one embodiment of the present invention.

Referring now to FIG. 7, a flow chart 700 illustrating steps in a computer implemented method for generating a user interface, in accordance with one embodiment of the present invention. The method of flow chart 700 is implemented within a pluggable architecture to generate any type of user interface depending on credential information and configuration properties.

The present embodiment begins by receiving an HTTP request, at 710. The HTTP request may be associated with a request for a first service. The request is generated by a browser that is associated with a user. In addition, the HTTP request is read to determine the contents of the request.

At 720, the present embodiment continues by invoking a first plug-in module from a plurality of plug-in modules. The plurality of plug-in modules provide similar or varying service applications. The invoking or selection of the first plug-in module is based on the credential information provided by the user. In one embodiment, if insufficient credential information is provided, a default plug-in module is provided, such as, an authentication plug-in module used for authenticating the user.

At 730, the present embodiment dynamically generates a user interface based on the HTTP request and the configuration properties that are defined by the first plug-in module. The user interface is customizable to the credential information provided by the user and to the particular plug-in module that is selected to provide authentication services.

While the methods of embodiments illustrated in flow charts 500, 600, and 700 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for dynamically generating web based user interfaces, have been described. While the invention is described in conjunction with the preferred embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

What is claimed is:

1. A method for displaying a web based user interface over a network comprising:

reading an HTTP request for authentication from a browser associated with a user, said HTTP request comprising credential information associated with said user;

invoking a first plug-in module from a plurality of plug-in modules used to authenticate said user, said invoking based on said credential information, said plurality of plug-in modules providing authentication services; and dynamically generating an authentication user interface based on said HTTP request and configuration properties defined by said first plug-in module, wherein dynamically generating said authentication user interface comprises:

selecting a first web page template from a plurality of web page templates based on said credential information and said configuration properties;

retrieving additional information from memory to be displayed in said first web page template, wherein said first web page template comprises said authentication user interface; and incorporating said additional information into said first web page template, wherein said authentication user interface is customized by modifying said first web page template, and wherein said authentication user interface is customized by adding at least one additional plug-in module in said plurality of plug-in modules.

2. The method of claim 1, further comprising:

configuring said first web page template with precompiled tag library components for rendering content in said authentication user interface.

3. The method of claim 1, wherein reading an HTTP request for authentication further comprises:

receiving said HTTP request over said network from said user, said HTTP request comprising a login request to authenticate said user.

4. The method of claim 3, wherein said login request comprises:

URL information; and query information comprising at least one URL parameter attached to said URL information, said query information comprising said credential information.

5. The method of claim 1, further comprising:

sending said authentication user interface to said browser over said network.

6. The method of claim 1, further comprising:

validating authentication of said user; and generating a session token associated with said user, said session token authorizing access to services and content by said user, said session token also comprising said credential information and any additional credential information discovered when authenticating said user.

7. A method for displaying a web based graphical user interface (GUI) over a network comprising:

receiving an HTTP request for a first service from a browser associated with a user, said HTTP request comprising credential information associated with said user;

invoking a first plug-in module from a plurality of plug-in modules, said invoking based on said credential information, said plurality of plug-in modules providing a plurality of services;

dynamically generating a first web based GUI based on said HTTP request and configuration properties defined by said first plug-in module, wherein dynamically generating the first web based GUI further comprises:

detecting a client type of said browser; and configuring said first web based GUI to be supportable by said client type;

requesting additional credential information from said user;

receiving said additional credential information from said user; and dynamically generating a second web based GUI based on said additional credential information and said configuration properties.

8. The method of claim 7, wherein said first service is an authentication service.

9. The method of claim 7, wherein said receiving an HTTP request, said invoking a first plug-in module and said dynamically generating said first web based GUI complies with the J2EE Assisted Take-Off (JATO) specification.

10. The method of claim 7, further comprising:
customizing said first GUI by modifying said configuration properties in said first plug-in module.

11. The method of claim 7, further comprising:
sending said GUI to said browser.

12. A system for displaying a web based user interface over a network comprising:
a web based user interface module for receiving an HTTP request over said network and dynamically generating a first user interface based on said HTTP request and configuration properties of a selected plug-in module;
a plurality of plug-in modules coupled to said web based user interface module, each of said plurality of plug-in modules providing web services; and
a model module coupled to said web based user interface module and said plurality of plug-in modules, said model module for selecting said selected plug-in module based on said HTTP request and for providing an interface between said web based user interface module and said plurality of plug-in modules.

13. The system of claim 12, wherein said web based user interface module comprises:
a controller for selecting a first view renderer module from a plurality of view renderer modules based on credential information provided in said HTTP request, said credential information associated with a user sending said HTTP request;
said plurality of view renderer modules coupled to said controller, each of said plurality of view renderer modules controlling the distribution of content to a plurality of web page templates; and
said plurality of web page templates.

14. The system of claim 12, wherein said model module comprises:
an application program interface (API) layer for interfacing with said web based user interface;
an service provider interface (SPI) layer coupled to said plurality of plug-in modules for interfacing with said plurality of plug-in modules;
a Java Authenticating and Authorization Service (JAAS) API layer coupled to said API layer for providing server authentication services;
a JAAS service provider interface (SPI) layer coupled to said SPI layer for providing an interface between said plurality of plug-in modules and said JAAS API; and
a framework layer for interfacing between said API layers and said SPI layers.

15. A computer system comprising:
a processor; and
a computer readable memory coupled to said processor and containing program instructions that, when executed, implement a method for displaying a web based user interface over a network comprising:

reading an HTTP request for authentication from a browser associated with a user, said HTTP request comprising credential information associated with said user;
invoking a first plug-in module from a plurality of plug-in modules used to authenticate said user, said invoking based on said credential information, said plurality of plug-in modules providing authentication services; and
dynamically generating an authentication user interface based on said HTTP request and configuration properties defined by said first plug-in module, wherein dynamically generating said authentication user interface comprises:
selecting a first web page template from a plurality of web page templates based on said credential information and said configuration properties;
retrieving additional information from memory to be displayed in said first web page template, wherein said first web page template comprises said user interface; and
incorporating said additional information into said first web page template,
wherein said authentication user interface is customized by modifying said first web page template, and
wherein said authentication user interface is customized by adding at least one additional plug-in module in said plurality of plug-in modules.

16. The computer system of claim 15, wherein said method further comprises:
configuring said first web page template with precompiled tag library components for rendering content in said authentication user interface.

17. The computer system of claim 15, wherein reading said HTTP request for authentication further comprises:
receiving said HTTP request over said network from said user, said HTTP request comprising a login request to authenticate said user.

18. The computer system of claim 17, wherein said login request comprises:
URL information; and
query information comprising at least one URL parameter attached to said URL information, said query information comprising said credential information.

19. The computer system of claim 15, wherein said method further comprises:
sending said authentication user interface to said browser over said network.

20. The computer system of claim 15, wherein said method further comprises:
validating authentication of said user; and
generating a session token associated with said user, said session token authorizing access to services and content by said user, said session token also comprising said credential information discovered when authenticating said user.

21. A method for displaying a web based user interface over a network comprising:
reading an HTTP request for authentication from a browser associated with a user, said HTTP request comprising credential information associated with said user;
invoking a first plug-in module from a plurality of plug-in modules used to authenticate said user, said invoking based on said credential information, said plurality of plug-in modules providing authentication services;
dynamically generating an authentication user interface based on said HTTP request and configuration properties defined by said first plug-in module, wherein dynamically generating said authentication user interface comprises:

selecting a first web page template from a plurality of web page templates based on said credential information and said configuration properties;

retrieving additional information from memory to be displayed in said first web page template, wherein said first web page template comprises said user interface; and incorporating said additional information into said first web page template; and configuring said first web page template with precompiled tag library components for rendering content in said authentication user interface.

22. The method of claim 21, further comprising:

customizing said authentication user interface by modifying at least one of said plurality of web page templates.

23. The method of claim 21, wherein reading an HTTP request for authentication further comprises:

receiving said HTTP request over said network from said user, said HTTP request comprising a login request to authenticate said user.

* * * * *